United States Patent
Shimada et al.

(10) Patent No.: US 12,241,276 B2
(45) Date of Patent: Mar. 4, 2025

(54) FLOATING-TYPE BASE ISOLATION SYSTEM

(71) Applicant: IHI CORPORATION, Tokyo (JP)

(72) Inventors: Takahiro Shimada, Tokyo (JP); Akihito Otani, Tokyo (JP); Satoru Kai, Tokyo (JP); Xinglong Yan, Ibaraki (JP); Tomohiko Yamamoto, Ibaraki (JP)

(73) Assignee: IHI Corporation, Tokyo (JP)

( * ) Notice: Subject to any disclaimer, the term of this patent is extended or adjusted under 35 U.S.C. 154(b) by 237 days.

(21) Appl. No.: 17/987,948

(22) Filed: Nov. 16, 2022

(65) Prior Publication Data

US 2023/0072457 A1    Mar. 9, 2023

Related U.S. Application Data (63) Continuation of application No. PCT/JP2021/019572, filed on May 24, 2021.

(30) Foreign Application Priority Data

Jun. 1, 2020  (JP) ................. 2020-095752

(51) Int. Cl.
    *E04H 9/02* (2006.01)
(52) U.S. Cl.
    CPC ................. *E04H 9/0235* (2020.05)
(58) Field of Classification Search
    CPC .................................................. E04H 9/0235
    See application file for complete search history.

(56) References Cited

U.S. PATENT DOCUMENTS 10,711,478 B2 * 7/2020 Henderson ............. E04H 9/02
2019/0323255 A1 * 10/2019 Henderson ............ E04H 9/028

FOREIGN PATENT DOCUMENTS

| JP | H08-086329 A | | 4/1996 |
| JP | 2002242990 A | * | 8/2002 |
| JP | 2002-310214 A | | 10/2002 |
| JP | 2003184343 A | * | 7/2003 |
| JP | 2003-328589 A | | 11/2003 |
| JP | 2009293324 A | * | 12/2009 |
| WO | 2020/093037 A2 | | 5/2020 |

OTHER PUBLICATIONS

International Search Report received for PCT Patent Application No. PCT/JP2021/019572 mailed on Jun. 15, 2021, 4 pages (2 pages of English translation and 2 pages of original International Search Report).

* cited by examiner

*Primary Examiner* — Joshua K Ihezie (57) ABSTRACT

A floating-type base isolation system includes: a liquid storage portion storing liquid; a floating structure floated and arranged on the liquid; and a gas accommodation space formed at a position in contact with the liquid and accommodating gas. A volume of the gas accommodation space is set based on a natural frequency of a system that responds to a seismic wave propagating in fluid including the liquid and the gas.

9 Claims, 12 Drawing Sheets

FLOATING-TYPE BASE ISOLATION SYSTEM

CROSS REFERENCE TO RELATED APPLICATIONS

This application is a continuation application of International Application No. PCT/JP2021/019572, filed on May 24, 2021, which claims priority to Japanese Patent Application No. 2020-095752, filed on Jun. 1, 2020, the entire contents of which are incorporated by reference herein.

BACKGROUND ART

Technical Field

The present disclosure relates to a floating-type base isolation system.

Patent Literature 1 discloses a floating structure which floats in liquid that fills inside a base isolation pit. The floating structure disclosed in Patent Literature 1 includes, for example, an air chamber on a lateral side.

CITATION LIST

Patent Literature

[Patent Literature 1] JP 2003-184343 A

SUMMARY OF INVENTION

Technical Problem

However, in the floating structure described in Patent Literature 1, when an earthquake occurs, a wave motion of a longitudinal wave (compression wave) caused by the earthquake propagates in the fluid, and a response of the floating structure and a device mounted thereto (hereinafter simply referred to as a mounted device) is excited. As a result, the floating structure and the mounted device may greatly vibrate. The air chamber is provided to the floating structure described in Patent Literature 1, but the excitation of the response of the floating structure and the mounted device cannot always be suppressed by simply providing the air chamber. Thus, it is required to reduce influence of the earthquake on the floating structure and the mounted device.

An object of the present disclosure is to reduce excitation of a floating structure and a mounted device caused by an earthquake.

Solution to Problem

In order to solve the above-mentioned problem, a floating-type base isolation system according to one aspect of the present disclosure includes: a liquid storage portion storing liquid; a floating structure floated and arranged on the liquid; and a gas accommodation space formed at a position in contact with the liquid and accommodating gas, wherein a volume of the gas accommodation space is set based on a natural frequency of a system that responds to a seismic wave propagating in fluid including the liquid and the gas.

The volume of the gas accommodation space may be set such that the natural frequency of the system that responds to the seismic wave is lower than a natural frequency of the floating structure and a device mounted to the floating structure.

The volume of the gas accommodation space may be set such that the natural frequency of the system that responds to the seismic wave is lower than 1 Hz.

As the volume of the gas accommodation space increases, a volume elastic modulus of the fluid may decrease, and the natural frequency of the system that responds to the seismic wave may decrease.

The system that responds to the seismic wave may include the floating structure, the liquid, and the gas, and the natural frequency f2 of the system that responds to the seismic wave may be represented by Expression (4) given below:

$$f2 = \frac{1}{2}\frac{\sqrt{\frac{AK_V}{d_0(\rho A d_0 + m)}}}{\pi} \quad (4)$$

An orifice may be formed in the gas accommodation space.

Advantageous Effects of Invention

According to the present disclosure, the excitation of the floating structure and the mounted device caused by the earthquake can be reduced.

DESCRIPTION OF EMBODIMENT

Now, with reference to the attached drawings, embodiments of the present disclosure are described in detail. The dimensions, materials, and specific numerical values represented in the embodiments are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

First Embodiment

Figure 1:
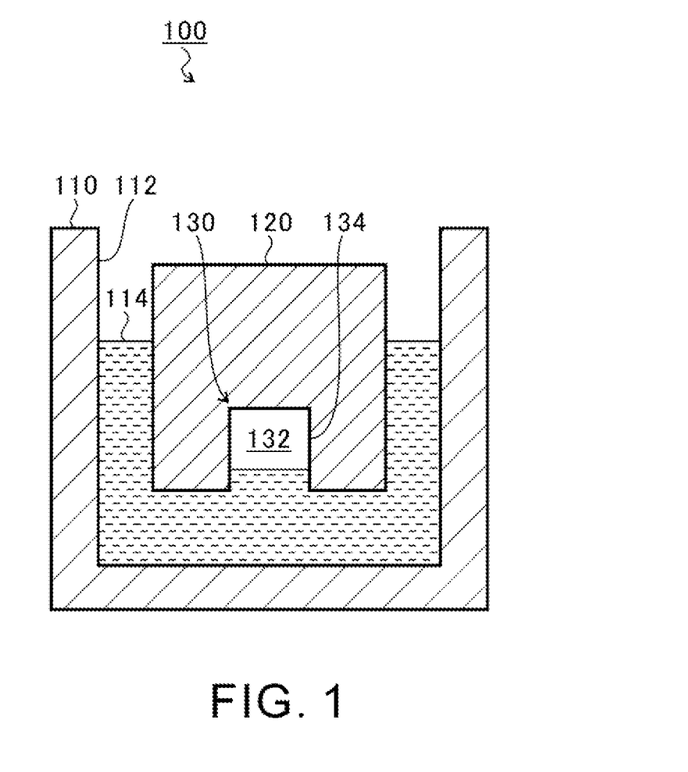
FIG. 1 is a schematic configuration view of a floating-type base isolation system according to a first embodiment.

FIG. 1 is a schematic configuration view of a floating-type base isolation system 100 according to a first embodiment. As illustrated in FIG. 1, the floating-type base isolation system 100 includes a liquid storage portion 110, a floating structure 120, and a gas accommodation portion 130.

The liquid storage portion 110 includes a recessed portion 112. In the recessed portion 112, liquid 114 is stored. The liquid 114 is, for example, water. The liquid 114 is not limited to water, and may be any liquid other than water, or may be other liquid including water as main component (for example, sea water).

The floating structure 120 is arranged so as to float on the liquid 114 stored in the liquid storage portion 110. The floating structure 120 is arranged so as to be spaced apart from the recessed portion 112 that defines a wall of the liquid storage portion 110. The floating structure 120 is, for example, a floating nuclear power plant. However, the floating structure 120 is not limited to the floating nuclear power plant, and may be a structure of other plant such as a wind power plant, a wave power plant, and a solar power plant, or may be a structure to which any equipment is mounted. In this embodiment, the floating structure 120 is, for example, a floating plant floating on an artificial lake, but may be an offshore plant floating on the sea.

The gas accommodation portion 130 forms a gas accommodation space 132. In the gas accommodation space 132, gas 134 is accommodated. The gas accommodation space 132 is formed at a position in contact with the liquid 114 and sealed by the floating structure 120. In this embodiment, the gas accommodation portion 130 is formed as a depression in a center portion of a bottom surface of the floating structure 120. The gas accommodation space 132 is formed in this gas accommodation portion 130. The gas accommodation space 132 in the example of FIG. 1 is a sealed space surrounded by five wall surfaces of the gas accommodation portion 130 and a liquid surface of the liquid 114. It is only required that the gas accommodation space 132 be formed at a position in contact with the liquid 114 and sealed, and it is not always required that the gas accommodation space 132 be formed in the floating structure 120. For example, the gas accommodation space 132 may be formed in the liquid 114 (see FIG. 7), or may be formed in the liquid storage portion 110 (see FIG. 8).

Incidentally, when an earthquake occurs, a wave motion of a longitudinal wave (compression wave) caused by the earthquake propagates in fluid including the liquid 114 and the gas 134, and a response of the floating structure 120 and a mounted device mounted thereto is excited. As a result, the floating structure 120 and the mounted device may greatly vibrate.

Figure 2A:
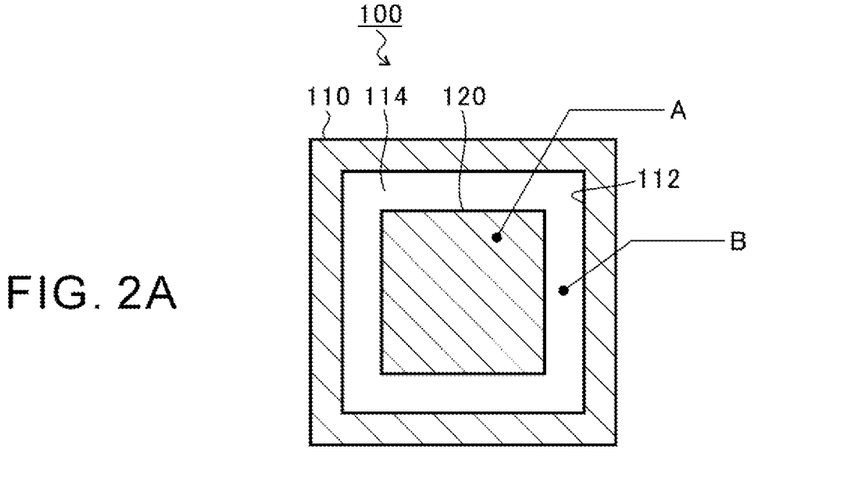
FIG. 2A is a plan view of the floating-type base isolation system viewed from above.
Figure 2B:
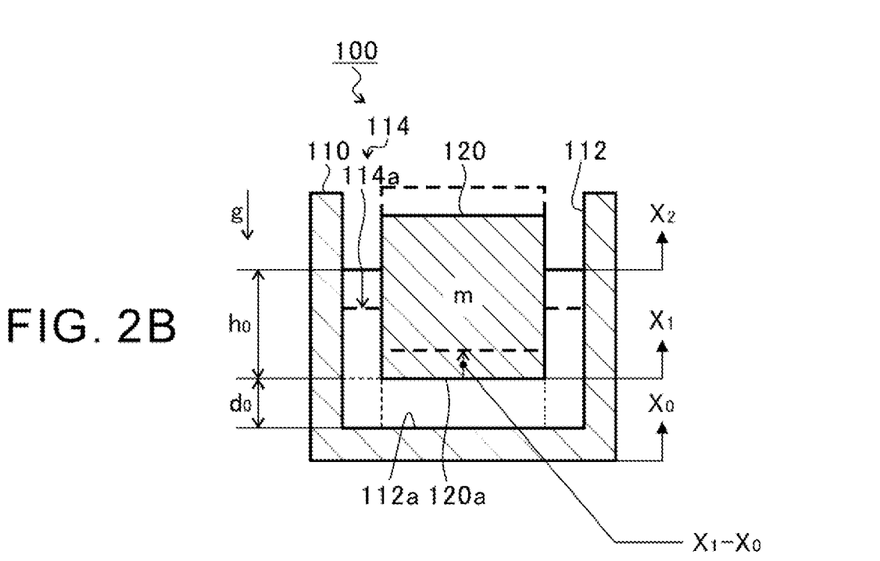
FIG. 2B is a cross-sectional view of the floating-type base isolation system.

FIG. 2A and FIG. 2B are schematic model views of the floating structure 120 which vertically vibrates by a wave motion of an earthquake. FIG. 2A is a plan view of the floating-type base isolation system 100 viewed from above. FIG. 2B is a cross-sectional view of the floating-type base isolation system 100.

In FIG. 2A, the reference symbol A indicates a projected area of the floating structure 120 in a vertical direction (the hatched region), and the reference symbol B indicates a projected area of the liquid 114 in the vertical direction (the non-hatched region). The projected area B is a value obtained by subtracting the projected area A from a projected area of the recessed portion 112 in the vertical direction.

In FIG. 2B, the reference symbol "m" indicates the mass of the floating structure 120. The reference symbol "g" indicates the gravitational acceleration. The reference symbol ho indicates a depth (distance) from a bottom surface 120a of the floating structure 120 to a water surface 114a of the liquid 114. The reference symbol do indicates a depth (distance) from a bottom surface 112a of the recessed portion 112 to the bottom surface 120a of the floating structure 120. The reference symbol $X_0$ indicates a displacement of a vertical vibration of the liquid storage portion 110. The reference symbol $X_1$ indicates a displacement of a vertical vibration of the floating structure 120. The reference symbol $X_2$ indicates a displacement of a vertical vibration of the water surface 114a of the liquid 114.

The vertical vibrations in a case where the floating structure 120 is considered to be excited by the wave motion of the earthquake can be represented by motion equations of Expression (1) and Expression (2) given below.

$$\begin{cases} -(A\rho d_0 + m)\dfrac{d^2 x_1}{dt^2} - mg + F_A + \Delta F_A = 0 & (1) \\ -\rho B(h_0 + d_0)\dfrac{d^2 x_2}{dt^2} - \rho B h_0 g + F_B + \Delta F_B = 0 & (2) \end{cases}$$

In Expression (1) and Expression (2), ρ indicates a density of the liquid 114. $F_A$ and $F_B$ indicate load variations caused by rising and falling of the floating structure 120. $\Delta F_A$ and $\Delta F_B$ indicate load variations caused by a volume change in the liquid 114.

When the motion equations are solved, there can be obtained equations of natural frequencies in two vibration modes represented by Expression (3) and Expression (4) given later. The natural frequencies represented by Expression (3) and Expression (4) indicate natural frequencies when the floating structure 120, the liquid 114, and the gas 134 act as one system (hereinafter simply referred to as a system). Expression (3) represents an expression of a natural frequency f1 in a primary mode (hereinafter referred to as a mode 1) of the system. Expression (4) represents an expression of a natural frequency f2 in a secondary mode (hereinafter referred to as a mode 2) of the system.

$$f1 = \dfrac{\sqrt{2}}{2} \cdot \dfrac{\sqrt{\dfrac{\rho A g}{\rho A d_0 + m}}}{\pi} \qquad (3)$$

-continued $$f2 = \frac{1}{2} \frac{\sqrt{\frac{AK_V}{d_0(\rho A d_0 + m)}}}{\pi} \quad (4)$$

In Expression (4), Kv indicates a volume elastic modulus of the entire fluid including both of the liquid 114 and the gas 134 (hereinafter referred to as an equivalent volume elastic modulus), and is represented by Expression (5) given below.

$$K_V = \frac{K_a K_w}{\alpha K_a - \alpha K_w - K_a} \quad (5)$$

In Expression (5), Ka indicates a volume elastic modulus of the gas 134, and Kw indicates a volume elastic modulus of the liquid 114. Moreover, a indicates a ratio of the volume of the gas 134 to a total volume of the liquid 114 and the gas 134. When the volume of the liquid 114 is denoted by Vw, and the volume of the gas 134 (in this case, the volume of the gas accommodation space 132) is denoted by Va, the ratio α can be represented by Va/(Vw+Va).

As appreciated from Expression (5), the equivalent volume elastic modulus Kv correlates with the ratio α. That is, the equivalent volume elastic modulus Kv correlates with the volume Va of the gas accommodation space 132 and the volume Vw of the liquid 114. As the volume Va of the gas accommodation space 132 increases, the ratio α increases, and the equivalent volume elastic modulus Kv decreases.

Figure 3A:
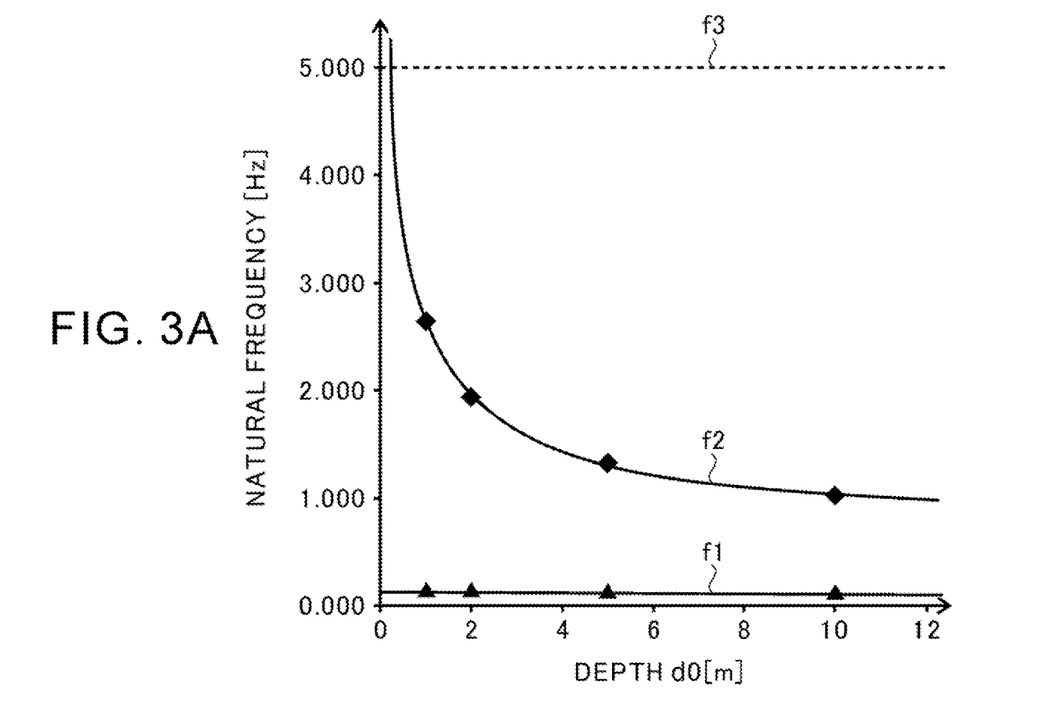
FIG. 3A is a graph for showing a relationship between a depth $d_0$ of FIG. 2B and a natural frequency.
Figure 3B:
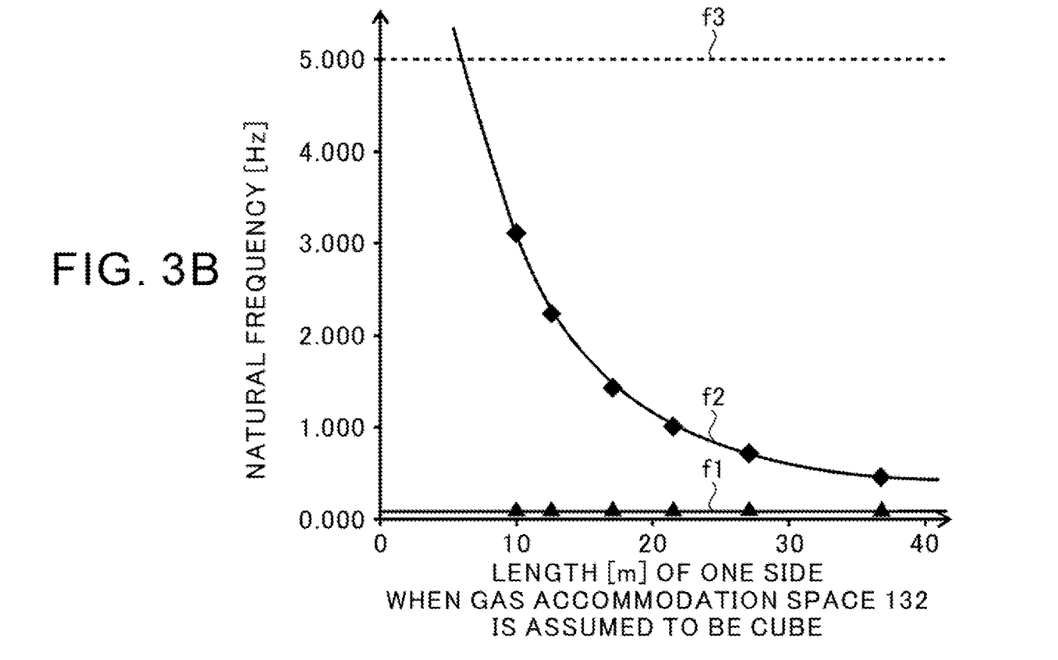
FIG. 3B is a graph for showing a relationship between a volume Va of a gas accommodation space and the natural frequency.

FIG. 3A and FIG. 3B are graphs for showing an example of calculation results of the natural frequencies through use of Expression (3) and Expression (4). In FIG. 3A and FIG. 3B, the natural frequency f1 in the mode 1 calculated through use of Expression (3) is indicated by black triangles, and the natural frequency f2 in the mode 2 calculated through use of Expression (4) is indicated by black diamonds. Moreover, a natural frequency f3 of the mounted device mounted to the floating structure 120 is indicated by a broken line. In this case, as an example of the natural frequency f3 of the mounted device, 5 Hz is set. FIG. 3A is a graph for showing a relationship between the depth do of FIG. 2B and the natural frequency. FIG. 3B is a graph for showing a relationship between the volume Va of the gas accommodation space 132 and the natural frequency.

Parameters used for the calculation are the mass m=1×10⁹ kg, the projected area A=40,000 m², the density p of the liquid 114=1,000 kg/m³, the volume elastic modulus Kw of the liquid 114=2.25×10⁹ N/m², and the volume elastic modulus Ka of the gas 134=1.40×10⁵ N/m². Parameters given in the case in which the volume Va of the gas accommodation space 132 of FIG. 3B is changed are, for example, the ratio α=0.00973 and the equivalent volume elastic modulus Kv=1.43×10⁷ N/m² when the volume Va of the gas accommodation space 132 is 10,000 m³.

As shown in FIG. 3A, the natural frequency f1 in the mode 1 is a substantially constant value even when the depth do changes. Meanwhile, the natural frequency f2 in the mode 2 becomes a smaller value as the depth do increases, and can be a value smaller than the natural frequency f3.

As shown in FIG. 3B, the natural frequency f1 in the mode 1 is a substantially constant value even when the size of the gas accommodation space 132 changes. Meanwhile, the natural frequency f2 in the mode 2 becomes a smaller value as the volume Va of the gas accommodation space 132 increases, and can be a value smaller than the natural frequency f3.

Figure 4A:
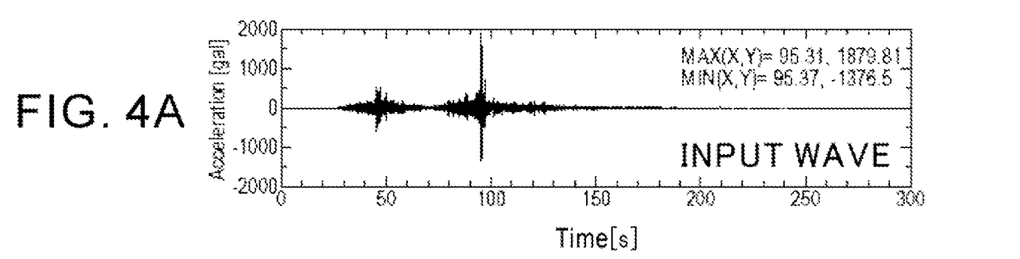
FIG. 4A is a graph for showing an acceleration time history waveform (input wave) of an earthquake motion.

FIG. 4A to FIG. 4D are graphs for showing an example of a calculation result of a seismic response when the volume Va of the gas accommodation space 132 is changed. FIG. 4A is a graph for showing an acceleration time history waveform (input wave) of an earthquake motion. The seismic wave used for the calculation as the input wave of FIG. 4A is a vertical motion component of a Tsukidate-observed wave of the off the Pacific coast of Tohoku Earthquake observed by the K-net of the National Research Institute for Earth Science and Disaster Resilience.

Figure 4B:
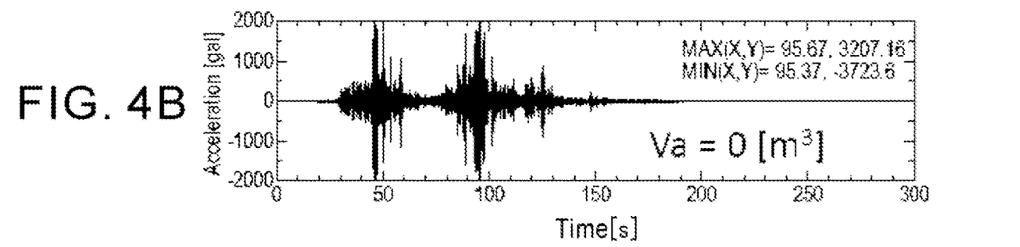
FIG. 4B is a graph for showing an acceleration time history waveform of a seismic response of a floating structure and a mounted device when the volume Va of the gas accommodation space is 0 $m^3$.
Figure 4C:
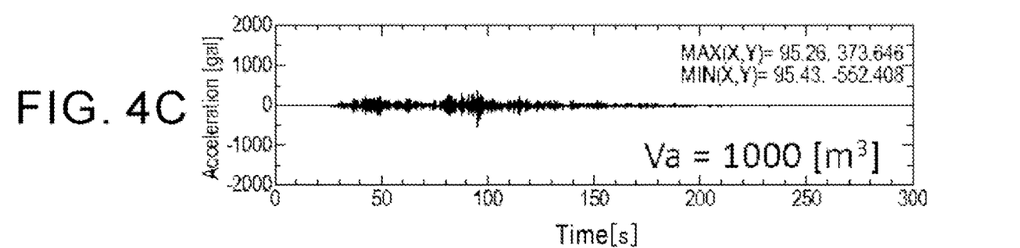
FIG. 4C is a graph for showing the acceleration time history waveform of the seismic response of the floating structure and the mounted device when the volume Va of the gas accommodation space is 1,000 $m^3$.
Figure 4D:
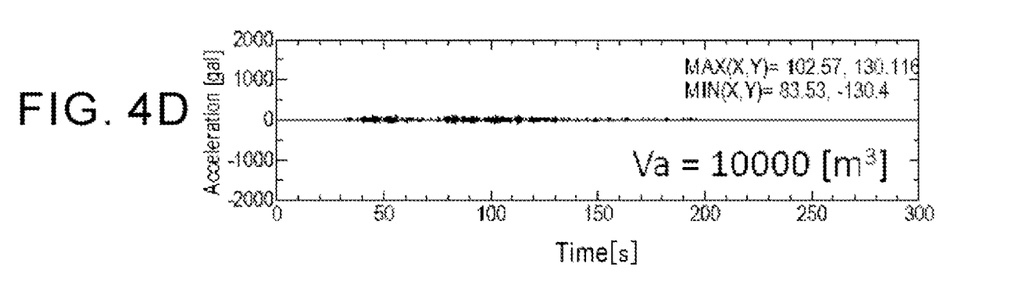
FIG. 4D is a graph for showing the acceleration time history waveform of the seismic response of the floating structure and the mounted device when the volume Va of the gas accommodation space is 10,000 $m^3$.

FIG. 4B is a graph for showing an acceleration time history waveform of a seismic response of the floating structure 120 and the mounted device when the volume Va of the gas accommodation space 132 is 0 m³. FIG. 4C is a graph for showing an acceleration time history waveform of a seismic response of the floating structure 120 and the mounted device when the volume Va of the gas accommodation space 132 is 1,000 m³. FIG. 4D is a graph for showing an acceleration time history waveform of a seismic response of the floating structure 120 and the mounted device when the volume Va of the gas accommodation space 132 is 10,000 m³. As shown in FIG. 4A to FIG. 4D, as the volume Va of the gas accommodation space 132 increases, the seismic response of the floating structure 120 and the mounted device can be reduced.

Figure 5:
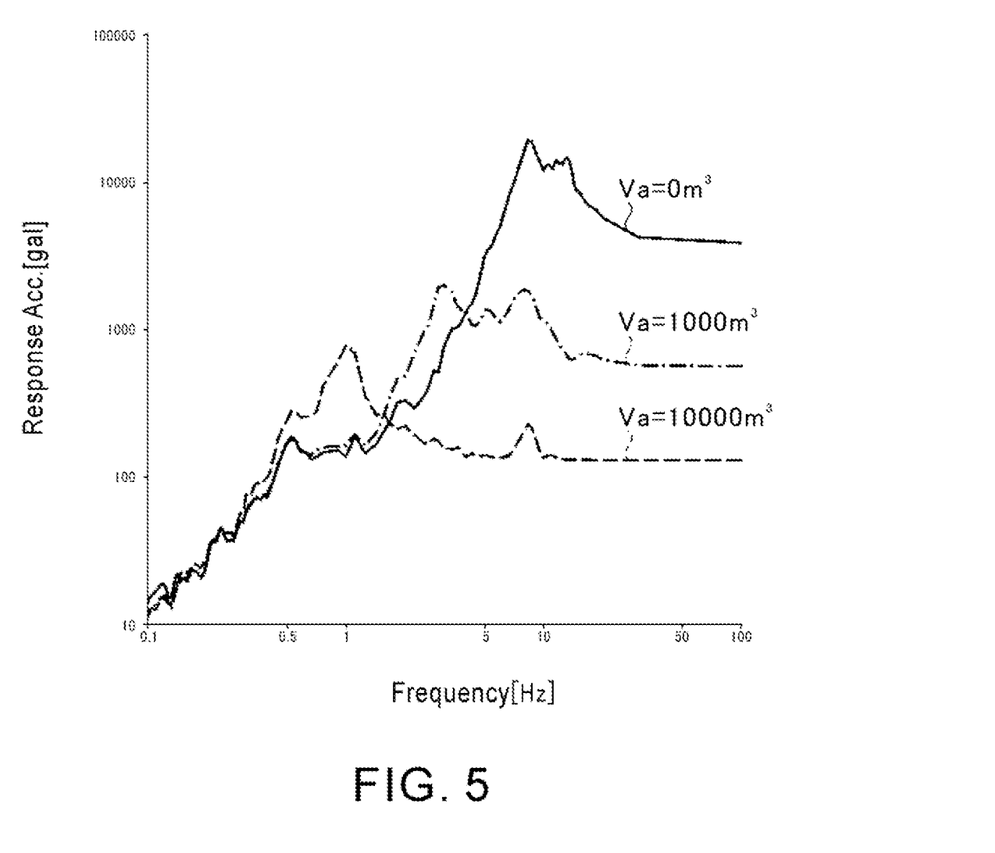
FIG. 5 is a graph for showing an example of response spectra when the volume of the gas accommodation space is changed.

FIG. 5 is a graph for showing an example of response spectra when the volume Va of the gas accommodation space 132 is changed. In FIG. 5, a response spectrum in a case where the volume Va of the gas accommodation space 132 is 0 m³ is indicated by a solid line. A response spectrum in a case where the volume Va is 1,000 m³ is indicated by a one-dot chain line. A response spectrum in a case where the volume Va is 10,000 m³ is indicated by a broken line. In this case, there are shown the changes in response spectrum given when a damping ratio "h" is 0.05 and the volume Va of the gas accommodation space 132 is changed.

In this embodiment, a natural frequency of the mounted device mounted to the floating structure 120 is several Hz (for example, 5 Hz) to several tens of Hz (for example, 30 Hz). When the volume Va is 0, the natural frequency f2 in the mode 2 of the system is close to the natural frequency of the mounted device mounted to the floating structure 120. Thus, as shown in FIG. 5, when the volume Va is 0, the response of the mounted device mounted to the floating structure 120 is excited by the wave motion of the longitudinal wave (compression wave) of the earthquake, and the mounted device thus greatly vibrates.

The natural vibration characteristic of the wave motion propagating in the fluid depends on the volume elastic modulus of the fluid. In this embodiment, the volume Va of the gas accommodation space 132 is appropriately set to adjust the equivalent volume elastic modulus Kv determined by the liquid 114 and the gas 134, to thereby separate the natural frequency f2 in the mode 2 of the system from the natural frequency of the floating structure 120 and the mounted device. As a result, in FIG. 5, the excitation of the seismic response of the system can be suppressed as in the cases in which volume Va is 1,000 m³ and 10,000 m³.

As described above, according to this embodiment, the volume Va of the gas accommodation space 132 is set based on the natural frequency of the system that responds to the seismic wave propagating in fluid including the liquid 114 and the gas 134. Specifically, the volume Va of the gas accommodation space 132 is set such that the natural frequency of the system that responds to the seismic wave is lower than the natural frequency of the floating structure 120 and the mounted device.

The natural frequency of the system that responds to the seismic wave is the natural frequency f2 in the mode 2 represented by Expression (4) given above. As the volume Va of the gas accommodation space 132 increases, the volume elastic modulus (equivalent volume elastic modulus Kv) of the fluid decreases, and the natural frequency of the system that responds to the seismic wave decreases. As a result, it is possible to reduce the excitation of the floating structure 120 and the mounted device by the earthquake.

The volume Va of the gas accommodation space 132 is set such that the natural frequency of the system that responds to the seismic wave is lower than 1 Hz. The natural frequency (dominant frequency) of a usual earthquake is, for example, 1 Hz to 10 Hz. The natural frequency of the system can be separated from the natural frequency of the earthquake by setting the natural frequency of the system to a frequency lower than 1 Hz. As a result, it is possible to reduce the excitation of the floating structure 120 and the mounted device by the earthquake.

Second Embodiment

Figure 6:
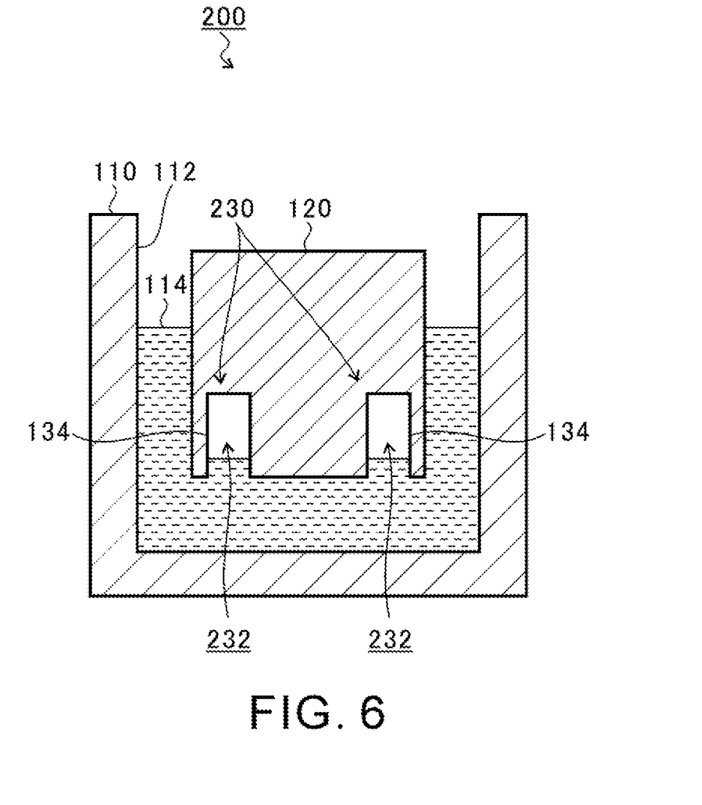
FIG. 6 is a schematic configuration view of a floating-type base isolation system according to a second embodiment.

FIG. 6 is a schematic configuration view of a floating-type base isolation system 200 according to a second embodiment. Components substantially equivalent to those of the floating-type base isolation system 100 according to the first embodiment are denoted by the same reference symbols, and description thereof is omitted. The floating-type base isolation system 200 according to the second embodiment is different from the floating-type base isolation system 100 according to the first embodiment in that the floating-type base isolation system 200 includes a gas accommodation portion 230 in place of the gas accommodation portion 130 in the first embodiment. Other configurations are the same as those of the floating-type base isolation system 100 according to the first embodiment.

The gas accommodation portion 230 forms gas accommodation spaces 232. In the gas accommodation spaces 232, the gas 134 is accommodated. The gas accommodation spaces 232 are formed at positions in contact with the liquid 114 and sealed by the floating structure 120. The gas accommodation spaces 232 are formed closer to an outer peripheral surface with respect to the center portion of the bottom surface of the floating structure 120. In this embodiment, two gas accommodation spaces 232 are formed at positions in point-symmetry with each other about the center of the bottom surface of the floating structure 120. However, the number of gas accommodation spaces 232 is not limited to two, and three or more gas accommodation spaces 232 may be formed at positions in point-symmetry with one another about the center of the bottom surface of the floating structure 120. As a result, posture stability can be increased compared with the floating structure 120 in the first embodiment.

According to the second embodiment, similarly to the first embodiment, the volume Va of the gas accommodation spaces 232 is set based on the natural frequency of the system that responds to the seismic wave propagating in fluid including the liquid 114 and the gas 134. Specifically, the volume Va of the gas accommodation spaces 232 is set such that the natural frequency of the system that responds to the seismic wave is lower than the natural frequency of the floating structure 120 and the mounted device. As a result, functions and effects similar to those of the first embodiment can be obtained.

Third Embodiment

Figure 7:
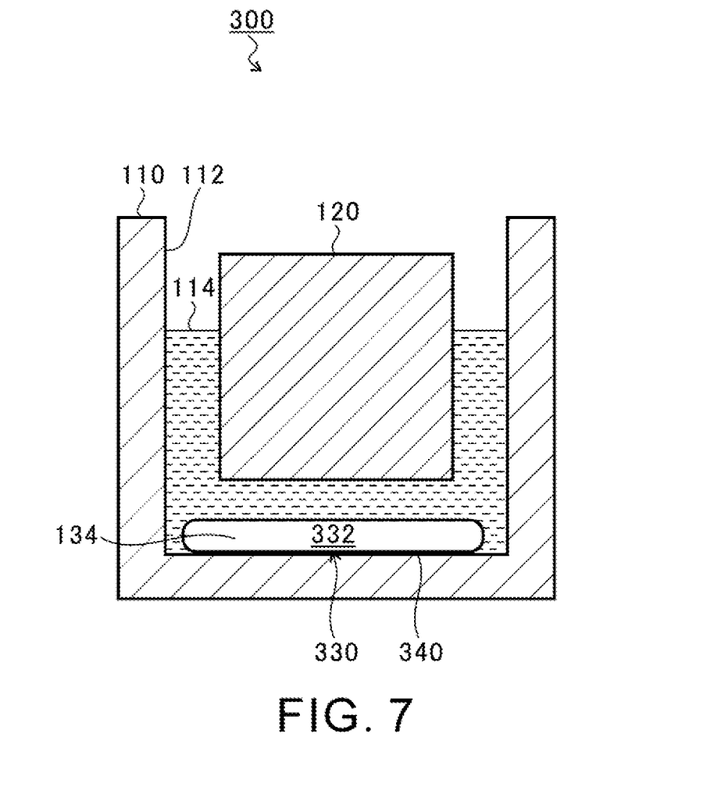
FIG. 7 is a schematic configuration view of a floating-type base isolation system according to a third embodiment.

FIG. 7 is a schematic configuration view of a floating-type base isolation system 300 according to a third embodiment. Components substantially equivalent to those of the floating-type base isolation system 100 according to the first embodiment are denoted by the same reference symbols, and description thereof is omitted. The floating-type base isolation system 300 according to the third embodiment is different from the floating-type base isolation system 100 according to the first embodiment in that the floating-type base isolation system 300 includes a gas accommodation portion 330 in place of the gas accommodation portion 130 in the first embodiment. Other configurations are the same as those of the floating-type base isolation system 100 according to the first embodiment.

The gas accommodation portion 330 includes an elastic film 340 and a gas accommodation space 332 formed inside the elastic film 340. The elastic film 340 is, for example, made of a rubber material, and has stretchability. In the gas accommodation space 332, the gas 134 is accommodated. The gas accommodation space 332 is formed at a position in contact with the liquid and sealed in the liquid 114. In this embodiment, the gas accommodation space 332 is located between the bottom surface 112a (see FIG. 2B) of the recessed portion 112 of the liquid storage portion 110 and the bottom surface 120a (see FIG. 2B) of the floating structure 120. However, the gas accommodation space 332 is not limited thereto, and may be provided at any position in the liquid 114 as long as it is sealed in the liquid 114 and not communicating with the atmosphere. As a result, for example, when a plurality of floating structures 120 are floated and arranged on the liquid 114, the gas accommodation space 332 can be shared without forming the gas accommodation space 132 in each floating structure 120.

According to the third embodiment, similarly to the first embodiment, the volume Va of the gas accommodation space 332 is set based on the natural frequency of the system that responds to the seismic wave propagating in fluid including the liquid 114 and the gas 134. Specifically, the volume Va of the gas accommodation space 332 is set such that the natural frequency of the system that responds to the seismic wave is lower than the natural frequency of the floating structure 120 and the mounted device. As a result, functions and effects similar to those of the first embodiment can be obtained.

Fourth Embodiment

Figure 8:
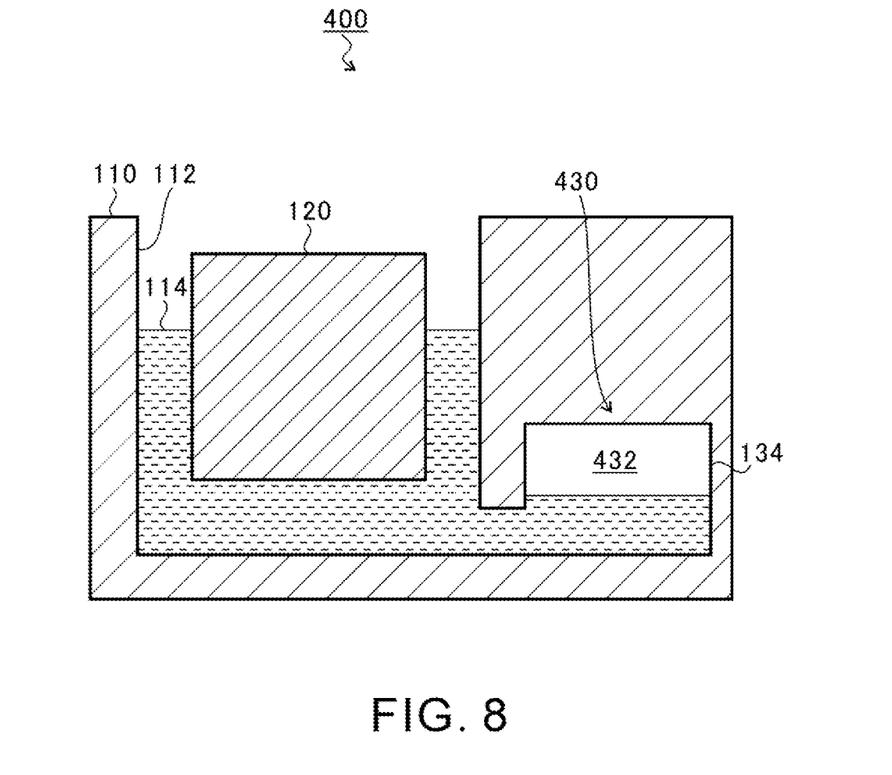
FIG. 8 is a schematic configuration view of a floating-type base isolation system according to a fourth embodiment.

FIG. 8 is a schematic configuration view of a floating-type base isolation system 400 according to a fourth embodiment. Components substantially equivalent to those of the floating-type base isolation system 100 according to the first embodiment are denoted by the same reference symbols, and description thereof is omitted. The floating-type base isolation system 400 according to the fourth embodiment is different from the floating-type base isolation system 100 according to the first embodiment in that the floating-type base isolation system 400 includes a gas accommodation portion 430 in place of the gas accommodation portion 130 in the first embodiment. Other configurations are the same as those of the floating-type base isolation system 100 according to the first embodiment.

The gas accommodation portion 430 forms a gas accommodation space 432. In the gas accommodation space 432, the gas 134 is accommodated. The gas accommodation space 432 is formed at a position in contact with the liquid and sealed by the liquid storage portion 110. As a result, when it is difficult to form the gas accommodation space 132 in the floating structure 120, the gas accommodation space 432 can be formed in the liquid storage portion 110 without forming the gas accommodation space 132 in the floating structure 120.

According to the fourth embodiment, similarly to the first embodiment, the volume Va of the gas accommodation space 432 is set based on the natural frequency of the system that responds to the seismic wave propagating in fluid including the liquid 114 and the gas 134. Specifically, the volume Va of the gas accommodation space 432 is set such that the natural frequency of the system that responds to the seismic wave is lower than the natural frequency of the floating structure 120 and the mounted device. As a result, functions and effects similar to those of the first embodiment can be obtained.

Fifth Embodiment

Figure 9:
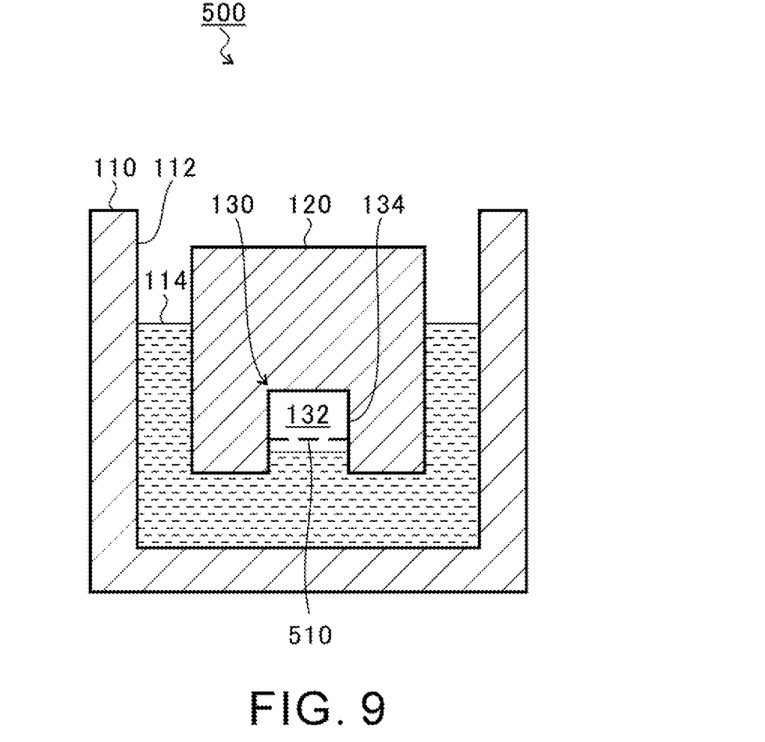
FIG. 9 is a schematic configuration view of a floating-type base isolation system according to a fifth embodiment.

FIG. 9 is a schematic configuration view of a floating-type base isolation system 500 according to a fifth embodiment. Components substantially equivalent to those of the floating-type base isolation system 100 according to the first embodiment are denoted by the same reference symbols, and description thereof is omitted. The floating-type base isolation system 500 according to the fifth embodiment is different from the floating-type base isolation system 100 according to the first embodiment in that an orifice 510 is added to the gas accommodation space 132 in the first embodiment. Other configurations are the same as those of the floating-type base isolation system 100 according to the first embodiment.

The orifice 510 is arranged in the gas accommodation space 132. As a result of the arrangement of the orifice 510 in the gas accommodation space 132, a resistance force is generated when the gas 134 passes through the orifice 510. This resistance force acts as a damping force on a vibrational response as a result of the wave motion transmission of the seismic wave to the floating structure 120 and the mounted device. The vibrational response of the floating structure 120 and the mounted device as a result of the wave motion transmission of the seismic wave can be suppressed by this damping force.

Figure 10:
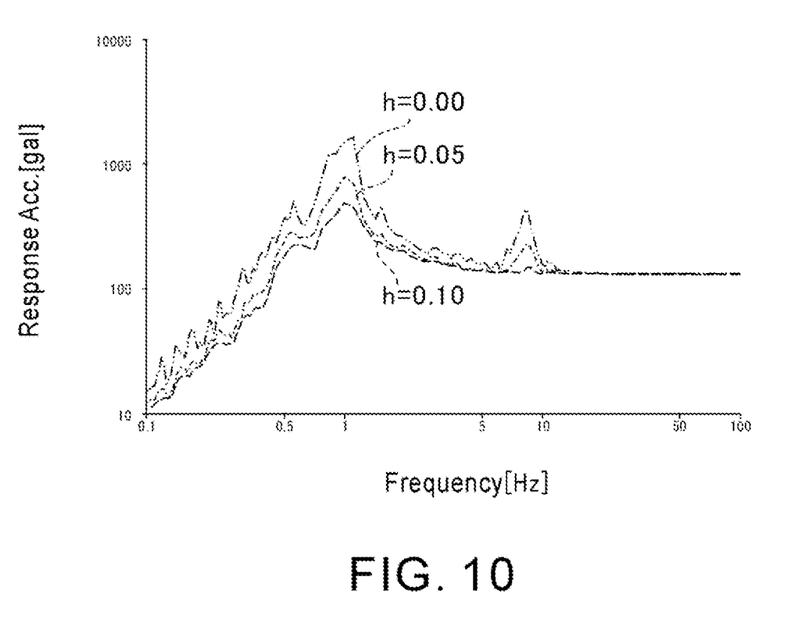
FIG. 10 is a graph for showing an example of the response spectra when a damping ratio is changed.

FIG. 10 is a graph for showing an example of the response spectra when the damping ratio "h" is changed. In FIG. 10, a response spectrum in a case where the damping ratio "h" is 0.00 is indicated by a two-dot chain line. A response spectrum in a case where the damping ratio "h" is 0.05 is indicated by a one-dot chain line. A response spectrum in a case where the damping ratio "h" is 0.10 is indicated by a broken line. In this example, there are shown the changes in response spectrum given when the volume Va of the gas accommodation space 132 is 10,000 m³ and the damping ratio "h" is changed.

As shown in FIG. 10, as the damping ratio "h" increases, a response acceleration can be reduced, and the vibrational response of the floating structure 120 and the mounted device as a result of the wave motion transmission of the seismic wave can be suppressed.

According to the fifth embodiment, the orifice 510 is formed in the gas accommodation space 132. With this configuration, in addition to the functions and the effects in the first embodiment, the vibrational response of the floating structure 120 and the mounted device as a result of the wave motion transmission of the seismic wave can further be suppressed.

Sixth Embodiment

Figure 11:
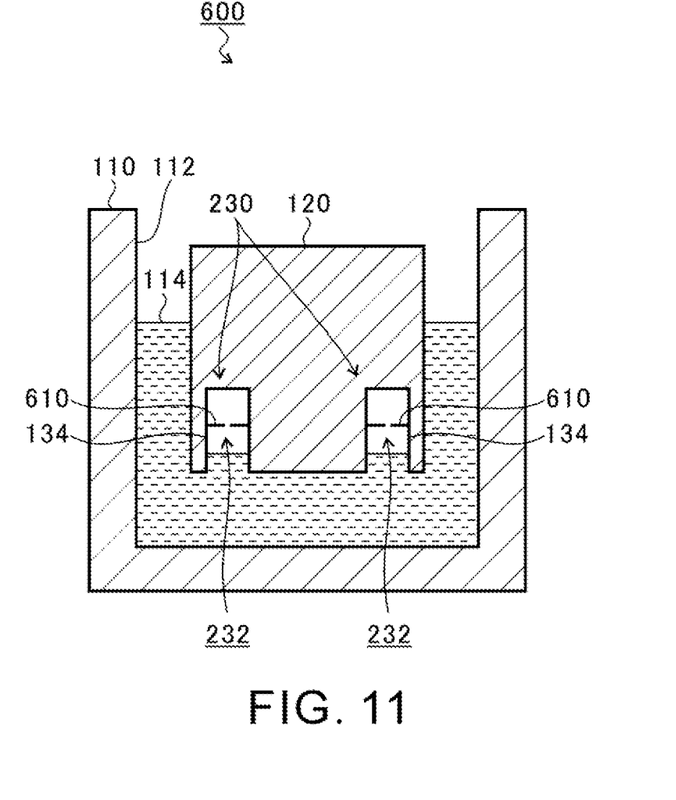
FIG. 11 is a schematic configuration view of a floating-type base isolation system according to a sixth embodiment.

FIG. 11 is a schematic configuration view of a floating-type base isolation system 600 according to a sixth embodiment. Components substantially equivalent to those of the floating-type base isolation system 200 according to the second embodiment are denoted by the same reference symbols, and description thereof is omitted. The floating-type base isolation system 600 according to the sixth embodiment is different from the floating-type base isolation system 200 according to the second embodiment in that orifices 610 are added to the gas accommodation spaces 232 in the second embodiment. Other configurations are the same as those of the floating-type base isolation system 200 according to the second embodiment.

The orifices 610 are arranged in the two gas accommodation spaces 232, respectively. As a result of the arrangement of the orifices 610 in the gas accommodation spaces 232, in addition to the functions and the effects in the second embodiment, the vibrational response of the floating structure 120 and the mounted device as a result of the wave motion transmission of the seismic wave can further be suppressed.

Seventh Embodiment

Figure 12:
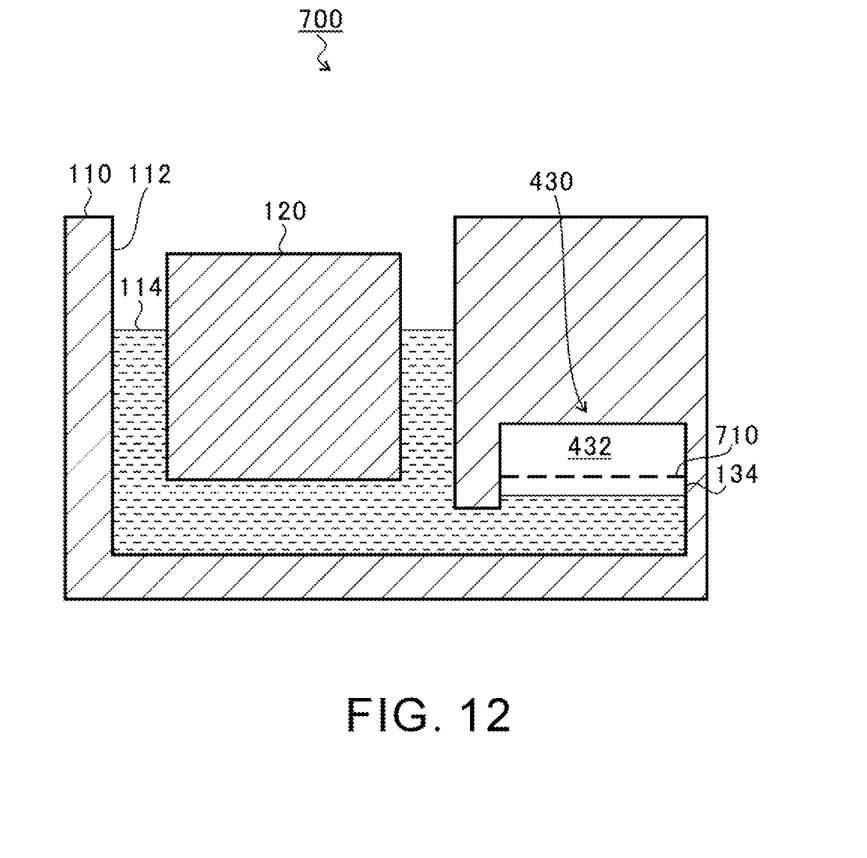
FIG. 12 is a schematic configuration view of a floating-type base isolation system according to a seventh embodiment.

FIG. 12 is a schematic configuration view of a floating-type base isolation system 700 according to a seventh embodiment. Components substantially equivalent to those of the floating-type base isolation system 400 according to the fourth embodiment are denoted by the same reference symbols, and description thereof is omitted. The floating-type base isolation system 700 according to the seventh embodiment is different from the floating-type base isolation system 400 according to the fourth embodiment in that an orifice 710 is added to the gas accommodation space 432 in the fourth embodiment. Other configurations are the same as those of the floating-type base isolation system 400 according to the fourth embodiment.

The orifice 710 is arranged in the gas accommodation space 432. As a result of the arrangement of the orifice 710 in the gas accommodation space 432, in addition to the functions and the effects in the fourth embodiment, the vibrational response of the floating structure 120 and the mounted device as a result of the wave motion transmission of the seismic wave can further be suppressed.

The embodiments have been described above with reference to the attached drawings, but, needless to say, the present disclosure is not limited to the embodiments. It is apparent that those skilled in the art may arrive at various alterations and modifications within the scope of claims, and those examples are construed as naturally falling within the technical scope of the present disclosure.

Moreover, the floating-type base isolation systems 100, 200, 300, 400, 500, 600, and 700 according to the embodiments can be combined. For example, the floating-type base isolation system 100 according to the first embodiment, the floating-type base isolation system 200 according to the second embodiment, and the floating-type base isolation system 300 according to the third embodiment may include the gas accommodation portion 430 in the fourth embodiment. Further, the floating-type base isolation system 100 according to the first embodiment and the floating-type base isolation system 200 according to the second embodiment may include the gas accommodation portion 330 in the third embodiment. In addition, the floating-type base isolation system 100 according to the first embodiment may include the gas accommodation portion 230 in the second embodiment.

What is claimed is:

1. A floating-type base isolation system, comprising:
a liquid storage portion including a recessed portion and storing liquid in the recessed portion;
a floating structure floated and arranged on the liquid; and
a gas accommodation space formed at a position in contact with the liquid and accommodating gas,
wherein
a volume of the gas accommodation space is set based on a natural frequency of a system that responds to a seismic wave propagating in fluid including the liquid and the gas,
the system that responds to the seismic wave includes the floating structure, the liquid, and the gas, and
the natural frequency f2 of the system that responds to the seismic wave is represented by Expression (4) given below:

$$f2 = \frac{1}{2}\frac{\sqrt{\frac{AK_V}{d_0(\rho A d_0 + m)}}}{\pi} \quad (4)$$

wherein:
A represents a projected area of the floating structure in a vertical direction;
Kv represents a volume elastic modulus of the entire fluid including both of the liquid and the gas;
d0 represents a distance from a bottom surface of the recessed portion to a bottom surface of the floating structure;
ρ represents a density of the liquid; and
m represents a mass of the floating structure.

2. The floating-type base isolation system according to claim 1, wherein the volume of the gas accommodation space is set such that the natural frequency of the system that responds to the seismic wave is lower than a natural frequency of the floating structure and a device mounted to the floating structure.

3. The floating-type base isolation system according to claim 1, wherein the volume of the gas accommodation space is set such that the natural frequency of the system that responds to the seismic wave is lower than 1 Hz.

4. The floating-type base isolation system according to claim 1, wherein as the volume of the gas accommodation space increases, a volume elastic modulus of the fluid decreases, and the natural frequency of the system that responds to the seismic wave decreases.

5. The floating-type base isolation system according to claim 1, wherein an orifice is formed in the gas accommodation space.

6. A floating-type base isolation system, comprising:
a liquid storage portion including a recessed portion and storing liquid in the recessed portion;
a floating structure floated and arranged on the liquid; and
a gas accommodation space formed at a position in contact with the liquid and accommodating gas,
wherein
a volume of the gas accommodation space is set based on a natural frequency of a system that responds to a seismic wave propagating in fluid including the liquid and the gas, and
a horizontal orifice is formed in the gas accommodation space so as to divide the gas accommodation space into two gas spaces, the horizontal orifice including vertically-penetrating holes.

7. The floating-type base isolation system according to claim 6, wherein the volume of the gas accommodation space is set such that the natural frequency of the system that responds to the seismic wave is lower than a natural frequency of the floating structure and a device mounted to the floating structure.

8. The floating-type base isolation system according to claim 6, wherein the volume of the gas accommodation space is set such that the natural frequency of the system that responds to the seismic wave is lower than 1 Hz.

9. The floating-type base isolation system according to claim 6, wherein as the volume of the gas accommodation space increases, a volume elastic modulus of the fluid decreases, and the natural frequency of the system that responds to the seismic wave decreases.

* * * * *